US006739793B2

(12) United States Patent
Baldino et al.

(10) Patent No.: US 6,739,793 B2
(45) Date of Patent: May 25, 2004

(54) MODULE LATCHING MECHANISM FOR MAILING MACHINE

(75) Inventors: Neil F. Baldino, Sandy Hook, CT (US); Norman R. Lilly, Monroe, CT (US); David Privin, Stamford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/247,049

(22) Filed: Sep. 18, 2002

(65) Prior Publication Data

US 2004/0052578 A1 Mar. 18, 2004

(51) Int. Cl.[7] .................................................. F16B 21/00

(52) U.S. Cl. ................................ 403/322.1; 403/322.3; 403/321

(58) Field of Search ........................... 403/322.1, 322.4, 403/322.3, 321; 439/157; 74/109

(56) References Cited

U.S. PATENT DOCUMENTS 4,561,414 A * 12/1985 Nozato ........................ 124/78
4,982,303 A * 1/1991 Krenz ........................ 360/137
5,110,301 A * 5/1992 Inoue et al. ................ 439/310
5,194,693 A 3/1993 Brzozowski et al.
5,904,092 A * 5/1999 Lyga ........................... 101/91
6,354,164 B1 * 3/2002 Megason et al. ............. 74/109

* cited by examiner

*Primary Examiner*—William L. Miller
(74) *Attorney, Agent, or Firm*—Brian A. Lemm; Angelo N. Chaclas; Charles R. Malandra, Jr.

(57) ABSTRACT

A connection device is provided for meshing of gears on disparate modules, such as those that form a mailing machine. A tongue having a rack can extend from a first module into a cavity formed in the second module. A spur gear is mounted to the second module and can engage the rack of the tongue received into the cavity. A mechanism controls movement of the first spur gear. The mechanism can include a drive gear meshed with the first spur gear and concentrically mounted on one end of a drive shaft with a worm gear mounted concentrically on an opposing end of the drive shaft. Rotation of the worm gear causes the spur gear and the drive gear to rotate and cause movement in the rack received into the cavity and separate or bring together the modules as a result of the movement in the rack.

19 Claims, 9 Drawing Sheets

MODULE LATCHING MECHANISM FOR MAILING MACHINE

BACKGROUND

This invention relates generally to the field of machine assembly, and more particularly to assembling and securing two modules of a mailing machine.

Generally, a mailing machine transports envelopes and other mailpieces along a deck so that various functions may be performed on the mailpiece at different locations along the deck. For example, one location along a deck may weigh the mailpiece, another location may seal the mailpiece and still another location may apply indicia for postage to the mailpiece. Apparatus for performing the various functions at each location can be built into disparate modules that can be assembled to create a mailing machine with desired functions. A drive mechanism can include drive rollers and/or belts mounted along the deck. A radial portion of the drive rollers or belt can contact an envelope to propel the envelope along the deck. The drive rollers can extend, for example, through aligned cutouts in the deck. The drive mechanism moves the envelope along the deck to different locations on the deck where a function may be performed.

When assembled, the modules can form the transport deck and also include apparatus to perform various functions on a mail piece as the mail piece traverses the transport deck. For example, one module may be primarily concerned with receiving and feeding envelopes into additional modules making up the mailing machine. Another module may have a primary purpose of performing a sealing function by moistening an adhesive which is present on the inner surface of an envelope flap before the envelope is fed into a nip which serves to seal the envelope with the moistened adhesive. Still another module may weigh the envelope or print indicia on the envelope.

Assembly of two or more modules can be accomplished at a customer site and can involve joining of irregular shapes which are included in a transport deck as well as joining of drive mechanisms utilized to transport the envelope along the transport deck. Since integration of two modules may be accomplished by a customer, it is beneficial if the assembly can be done without tools while providing secure and reliable latching and unlatching which can include mechanical and electrical interfaces.

Therefore, it would be advantageous to provide apparatus and methods that overcame the drawbacks of the prior art. In particular, it would be desirable to provide apparatus and methods that facilitates the assembly of modules on a mailing machine.

SUMMARY

Accordingly, a connection device is provided that facilitates assembly of the modules to form a mailing machine. A tongue having a rack can extend from a first module into a cavity formed in a second module. A spur gear is mounted to the second module and can engage the rack on the tongue received into the cavity. A mechanism can control movement of the first spur gear. The mechanism can include a drive gear meshed with the first spur gear and concentrically mounted on one end of a drive shaft with a worm gear mounted concentrically on an opposing end of the drive shaft. Rotation of the worm gear causes the spur gear and the drive gear to rotate and cause movement in the rack received into the cavity thereby separating or bringing together the modules as a result of the movement in the rack.

A worm can be mounted on a tubular extension protruding through the wall of a second module and engage the worm gear mounted concentrically on the opposing end of the drive shaft. A handle can also be connected to the tubular extension. In some embodiments, the handle can telescope from a housing of the second module to an operating position.

The connection device can also provide lost motion between the drive gear and the drive shaft. The lost motion can be sufficient to allow the rack to engage at least one gear tooth on the spur gear before rotation of the spur gear is restricted by the drive shaft. Lost motion can be provided, for example, by a cross pin secured to the drive shaft and engaging the drive gear at opposing surfaces formed into the drive gear to allow a predetermined angle of free rotation. A spring can also be included for maintaining the drive gear in a position allowing maximum lost motion before the gear motion is restricted.

Similarly, a method is provided for assembling modules on a mailing machine that includes setting a drive gear in a home position and manually aligning a tongue with a rack on a first module with a cavity having a drive gear on a second module. The rack can be operatively engaged with the drive gear. Turning a handle can rotate a worm mesh connected to the drive gear thereby causing the gear to rotate and move the rack. The setting of the drive gear can include a predetermined amount of lost motion associated with the drive gear.

Therefore it should now be apparent that the invention substantially achieves all the above aspects and advantages. Additional aspects and advantages of the invention will set forth in the description that follows, and in part will be obvious from the description, or may be learned by practice of the invention. Various features and embodiments are further described in the following figures, descriptions and claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for assembling modules of a machine, such as, for example, a mailing machine. During assembly of various modules or other portions of a mailing machine, various modules are aligned and secured together. Embodiments of the present invention facilitate alignment of different modules being assembled into a mailing machine and securing of the modules in an assembled state. While the present invention will be described with respect to a mailing machine, it should be understood that the present invention is not limited and can be used with any type of machine.

Mechanisms utilized can facilitate mating of two modules with a rack included in one module and a gear included in another module. Once engaged, the gear can be turned to draw the rack in and also mate the corresponding modules. Assembly motion of a mailing machine can move a rack tangentially relative to a gear with which it will need to mate in order for the mailing machine to become assembled. The present invention also provides apparatus and methods to facilitate the rack engaging the gear without the teeth of the rack colliding with the teeth of the gear which can cause a jam instead of meshing. Jamming can be particularly problematic if the gear is unable to rotate and accommodate the rack motion, such as when the gear is connected to a worm gear.

For the purpose of this application, one or more teeth of a gear become "jammed" with one or more teeth on a rack when the apex or tip of a tooth, of the gear comes into contact with the apex of a tooth on the rack. A jam is generally opposed to "meshing" of a gear and a rack, wherein meshing occurs when the apex of a tooth on the gear is inserted into the gullet of a tooth on the rack or an apex of a tooth on the rack is inserted into a gullet on the gear. Generally, meshed teeth allow rotational movement of the gear and linear movement of the rack with which it is meshed.

Figure 1:
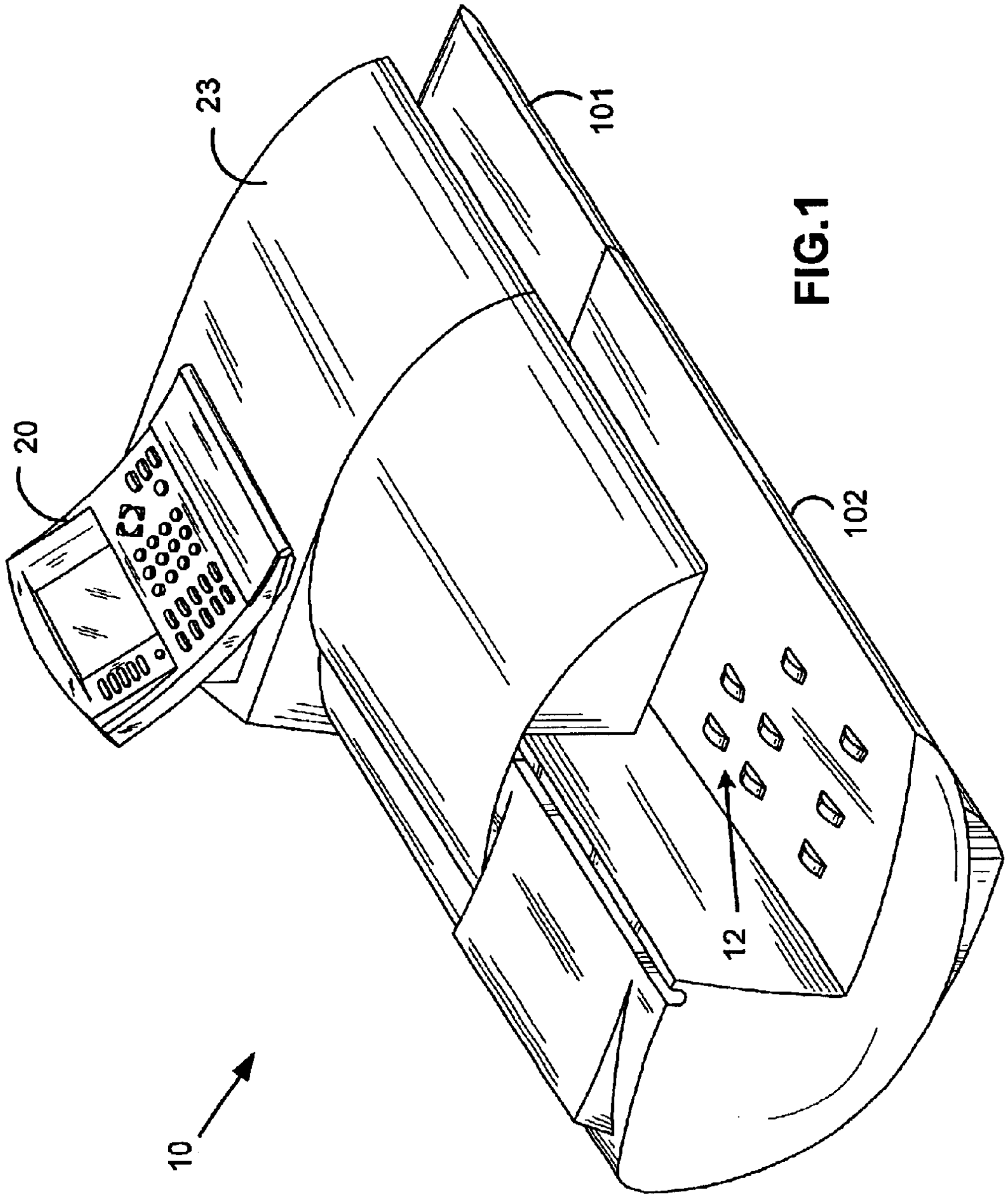
FIG. 1 illustrates a perspective view of a modular mailing machine of the type in which the present invention may be utilized.

Referring now to FIG. 1, there is seen a mailing machine generally designated by the reference numeral 10. The mailing machine 10 includes two modules, a first module 101, such as, for example, a metering module, which may or may not have a weighing functionality, and a second module 102, such as, for example, a feeder-sealer module. The details of construction of these modules in relation to the operation thereof form no part of the present invention, and therefore are not described in full detail. It is sufficient for an understanding of the invention to note generally that the feeder-sealer module 102 includes a feeding area 12 into which a stack of envelopes is placed, and a suitable feeding mechanism separates the envelopes seriatim and feeds them through the feeder-sealer module 102 in which the envelope flaps are opened, the flaps are moistened and the envelope flaps are then closed and sealed. The envelopes then travel from this module to the metering module 101 in which they optionally can be weighed, the amount of postage for each envelope is calculated by a postage meter generally designated by the numeral 20, and an appropriate postage indicia showing the postage is printed on the envelopes. The feed path along which the envelopes travel commences at the feeding area 12 on the feeder-sealer module 102, extends through both modules 102 and 101, and terminates at the discharge end 23 shown at the right side of the module 101 as viewed in FIG. 1. It will be apparent, of course, that both modules 101 and 102 are covered with suitable top, front, rear and side housing panels so as to enclose and protect the operating components of the modules.

Figure 2A:
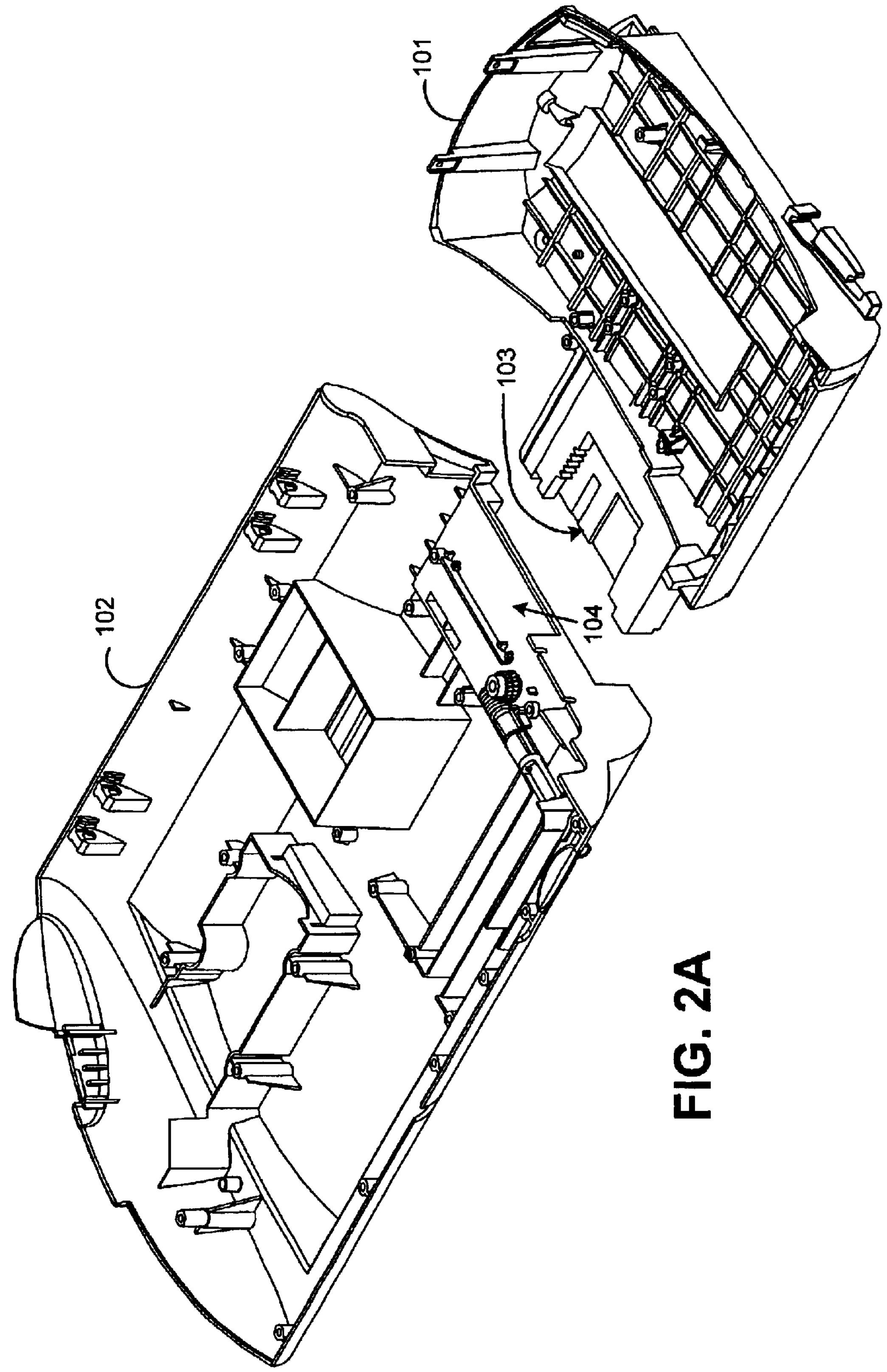
FIGS. 2*a* and 2*b* illustrate perspective views of basic module components that can be joined during the assembly of a mailing machine.
Figure 2B:
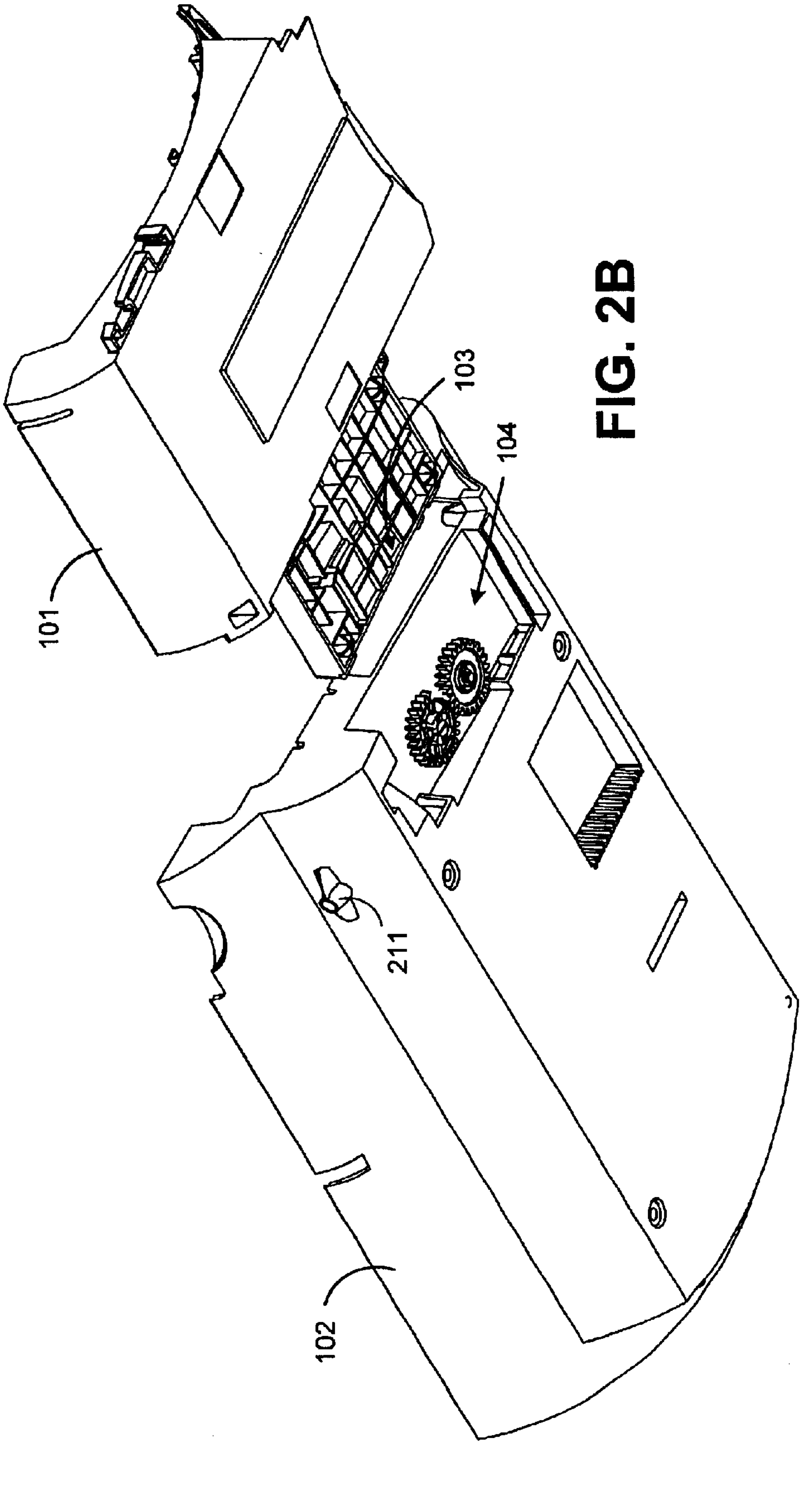

Referring now to FIGS. 2*a* and 2*b*, perspective views of basic components included in the two modules of a mailing machine 10 according to the present invention are illustrated. Generally, module 101 can be assembled with module 102. Components and mechanisms (not illustrated) mounted in the modules become properly aligned and positioned when the modules 101 and 102 arc assembled. To facilitate assembly of the first module 101 with the second module 102, a tongue 103 can be formed into or attached to the first module 101 and a cavity 104 can be formed into, or attached to, the second module 102. A manual portion of assembly can be accomplished by aligning the tongue 103 with the cavity 104 and inserting the tongue into the cavity 104. Embodiments can include mechanical devices to assist in alignment of the tongue with the cavity, such as an alignment pin being received into a bushing, a lip on the tongue being received into a groove in the cavity, or other device.

Figure 3A:
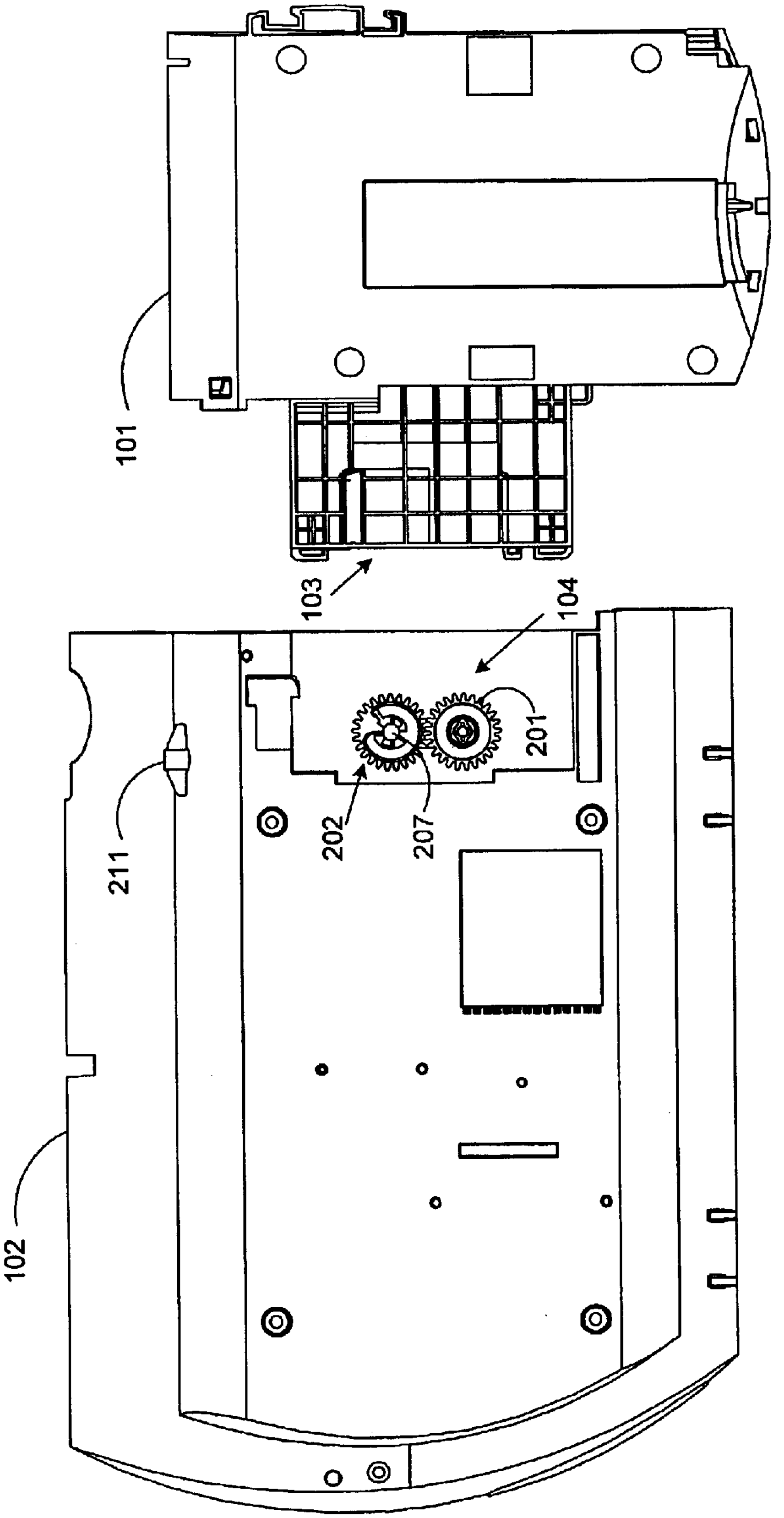
FIG. 3*a* illustrates a bottom up view of an embodiment of the present invention.

Referring now to FIG. 3*a*, a bottom up view of two exemplary modules of a mailing machine is illustrated, including a first spur gear 201 and a second spur gear 202. The second spur gear 202 can be operatively engaged with the first spur gear 201 and act as a drive gear to cause movement in the first spur gear 201. For purposes of this discussion, the second spur gear 202 will be referred to as the drive gear 202. Movement can be initiated and controlled by a handle 211 which can be rotated by an operator. The drive gear 202 can be mounted on a drive shaft 207 which is operatively linked to the handle 211 such that rotation of the handle causes the drive shaft 207 and the drive gear 202 to also rotate. Rotation of the drive gear 202 can, in turn, cause the first spur gear 201 to rotate.

Figure 3B:
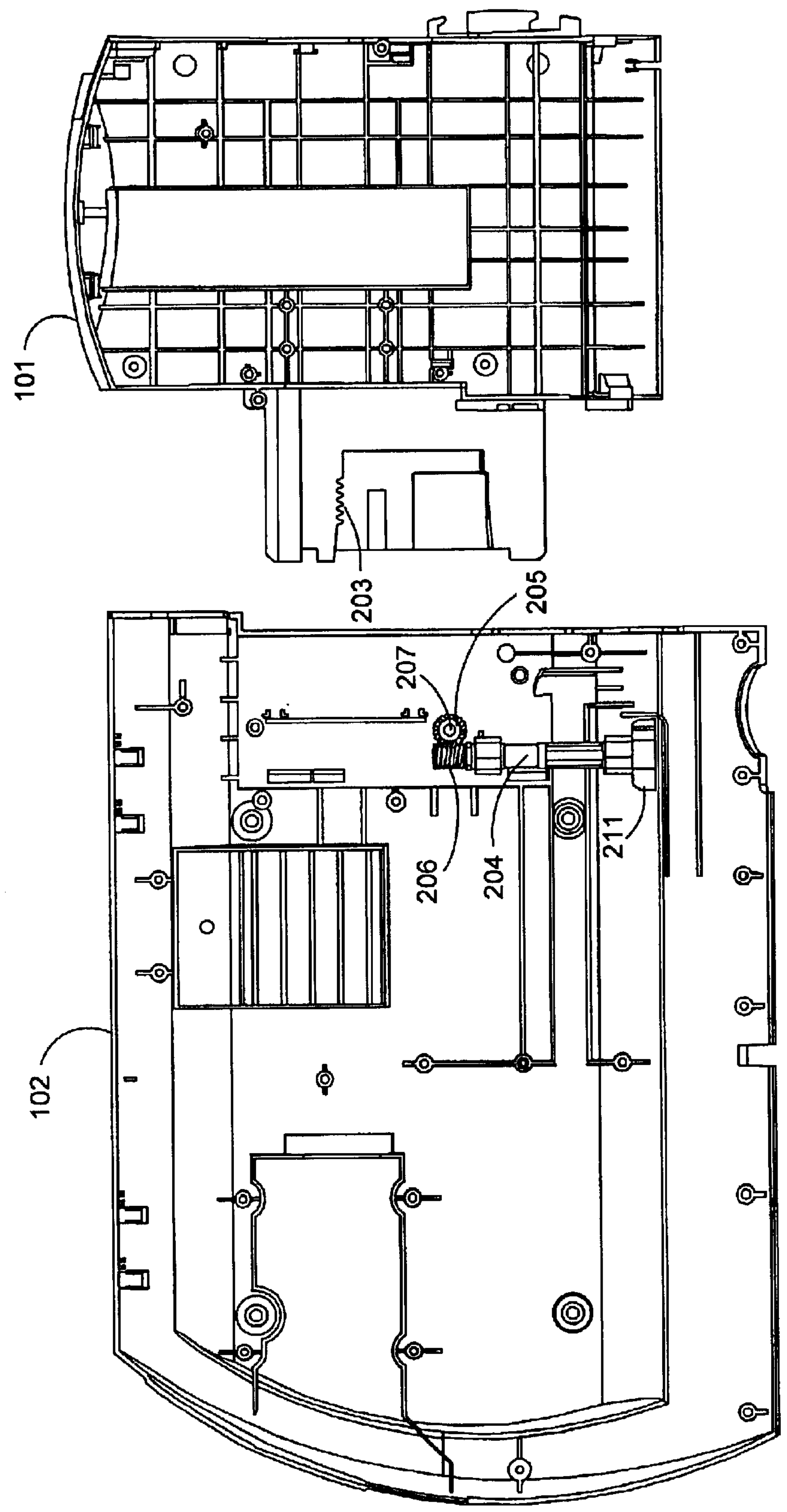
FIG. 3*b* illustrates a top down view of an embodiment of the present invention.

FIG. 3*b* illustrates a top down view of the same exemplary modules illustrated in FIG. 3*a*. Embodiments can include the drive shaft 207 as illustrated connected to a worm gear 205 mounted concentrically on the end of the drive shaft 207. A worm 206 can be operatively engaged with the worm gear 205. The worm 206 can be concentrically mounted on one end of a tubular extension 204 which can protrude through the side, or housing, of the second module 102 and be attached to the handle 211.

Rotation of the handle 211 can cause the tubular extension 204 to rotate and transfer the rotative movement to the second worm gear 206. Rotation of the worm 206 will cause the worm gear 205 to rotate and also cause the drive shaft 207 on which the worm gear 205 is mounted to rotate. The drive shaft 207 carries the rotative movement to the drive gear 202. The drive gear 202 is operatively engaged with the first spur gear 201, wherein rotation of the drive gear 202 causes the first spur gear 201 to also rotate.

During assembly of the first module 101 with the second module 102, a rack 203 mounted on, or formed into the tongue 103 can operatively engage the first spur gear 201 mounted within the cavity 104. Once the rack 203 is operatively engaged with the first spur gear 201, rotation of the first spur gear 201 will cause linear movement in the rack 203 and thereby cause the first module 101 and the second module 102 to move closer together or further apart depending upon the direction of the movement caused by the rotation.

Accordingly, embodiments can include assembly of a first module 101 and a second module 102 that is controlled by a gear train which can include the first spur gear 201, the drive gear 202, the drive shaft 207, a worm mesh including the worm gear 205 and the worm 206, the tubular extension 204 and the handle 211. The worm 206 is attached to the handle via the tubular portion 204 which extends through a wall of the second module 102 and connects to the handle 211. The first module 101 and the second module 102 can be fully assembled together by turning the worm 206 with the handle 211. The worm mesh formed by the worm gear 205 and the worm 206 secures the position of first module 101 in relation to the second module 102 via the self-locking nature of a worm mesh. In addition, the worm mesh can provide mechanical advantage to facilitate overcoming mating forces of the modules 101 and 102.

Some embodiments can include lost motion built into the gear train. In general, lost motion is the difference between the motion of a driver and that of a follower. As applied to the gear train, the drive shaft 207 is the driver and the first spur gear 201 is the follower. Lost motion includes a difference between rotative motion of the drive shaft 207 and rotative motion in the first spur gear 201. For example, 180 degrees of lost motion allows the drive shaft 207 to turn 180 degrees before causing motion in the drive gear 202 and resulting motion in the first spur gear 201.

Rotative motion in the drive shaft 207 is supplied by turning the handle 211. The handle 211 is connected to the tubular portion 204 on which the worm 206 is mounted. As the handle 211 is turned, the worm 206 turns and creates rotational movement in the worm gear 205, which is mounted on the drive shaft 207 and thereby causes motion in the drive shaft 207.

Lost motion built into the gear train can be compensated for during initial rotation of the handle 211 attached to the drive shaft 207, wherein an operator will turn the handle 211 through an arc of lost motion before causing movement in the gear train. In addition to facilitating gear alignment, lost motion can be useful, for example, to facilitate placing the handle 211 in a parked position. A parked position can include a cutout or keyed area formed into a wall of the second module 102 that secures the handle 211 from rotation and can help prevent accidental rotation. Some embodiments can include a handle 211 that can telescope out from the second module 102 into an operating position.

In another aspect, some embodiments can include a break away feature that prevents applying excessive force to any gear train components. For example, a break away can be built into the handle 211 to prevent an amount of torque above a threshold from being applied to the gear train via rotation of the handle 211.

Figure 4:
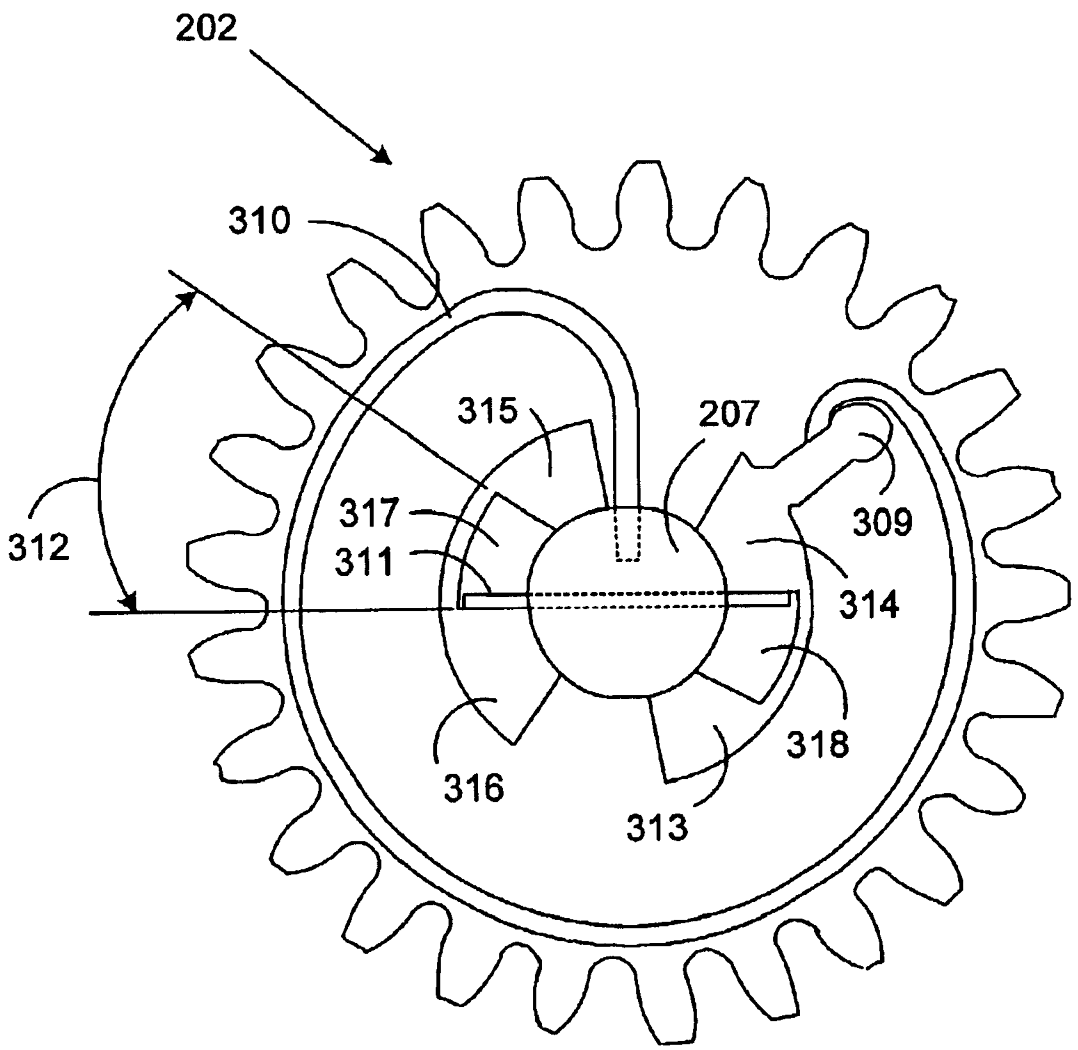
FIG. 4 illustrates a gear and a means for providing lost motion in relation to a drive shaft.

Referring now to FIG. 4, lost motion can be introduced into the gear train, for example, between the drive gear 202 and the drive shaft 207 that drives the drive gear 207 via a cross pin 311 contacting one or more cross pin stops 313–316. The cross pin 311 can be inserted through a bore in the drive shaft 207 or otherwise coupled to the drive shaft 207. The cross pin stops 313–316 can be positioned so that following a reversal in the direction of rotation of the drive shaft 207, the cross pin 311 can be rotated through a predetermined arc of free movement before engaging a cross pin stop 313–316 in the new direction of rotation.

Reversal of rotation of the drive shaft 207 can therefore cause the cross pin 311 to rotate through a free movement area 317–318 until the cross pin 311 contacts one or two cross pin stops 313–316 which will be in the path of rotation. For example, as illustrated, if the drive shaft 207 is rotated in a clockwise direction the cross pin 311 will contact cross pin stops 313 and 315 simultaneously. If the direction of rotation of the drive shaft 207 is changed to a counter-clockwise direction, the cross pin 311 will travel through free movement area 317–318 and contact cross pin stops 314 and 316 simultaneously.

An amount of free movement area 317, 318, which can be quantified as an arc 312, will determine how many degrees of lost motion the gear train will provide. An arc should take into account the diameter of the cross pin 311. Embodiments can include, for example, approximately 45 degrees of lost motion, 90 degrees of lost motion, 180 degrees of lost motion, or some other amount of lost motion.

Some embodiments can also include a means to return the cross pin 311 to a home position, or otherwise maintain the cross pin 311 in the home position, while the first module 101 and the second module 102 are separated. For example, a home position can include a position at a predetermined angle of rotation away from the drive gear 202 surface through which motion is transmitted. Some embodiments can include a predetermined angle that is calculated as, and approximately equal to $(X+0.5)*(360/Ng)$, wherein X can be any whole number, and will typically be limited to 1 or 2 and Ng can be a number equal to the number of teeth on the drive gear 202. Other angles may also be utilized. It is desirable for an angle utilized to facilitate placing the first gear 201 in a position favorable for engaging with a rack 203 incorporated into a first module during assembly with a second module 102 housing the first gear 201.

A means to return the cross pin 311 to the home position can include, for example, a spring 310 situated to rotate the drive gear 202 through any available free movement area 317–318 when the first module 101 and the second module 102 are separated. The spring 310 can be secured with a spring coupling 309 or other means.

Figure 5:
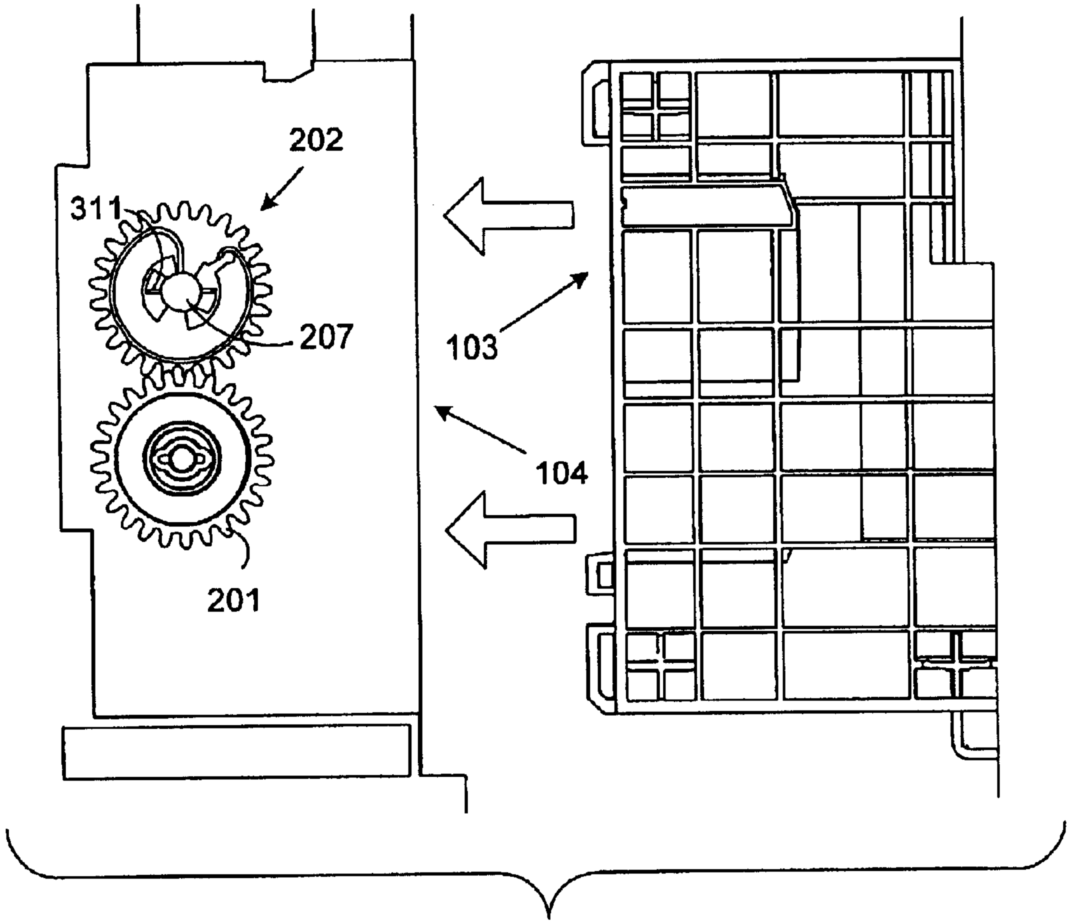
FIG. 5 illustrates a bottom up view of a tongue portion in relation to a cavity according to an embodiment of the present invention.

Referring now FIG. 5, details of the present invention are illustrated with an underside view of the cavity 104, including a drive gear 202 mounted on a drive shaft 207 and a first spur gear 201 meshed or otherwise actively engaged with the drive gear 202. A bottom up view of the tongue 103 is shown positioned to enter the cavity 104.

Figure 6:
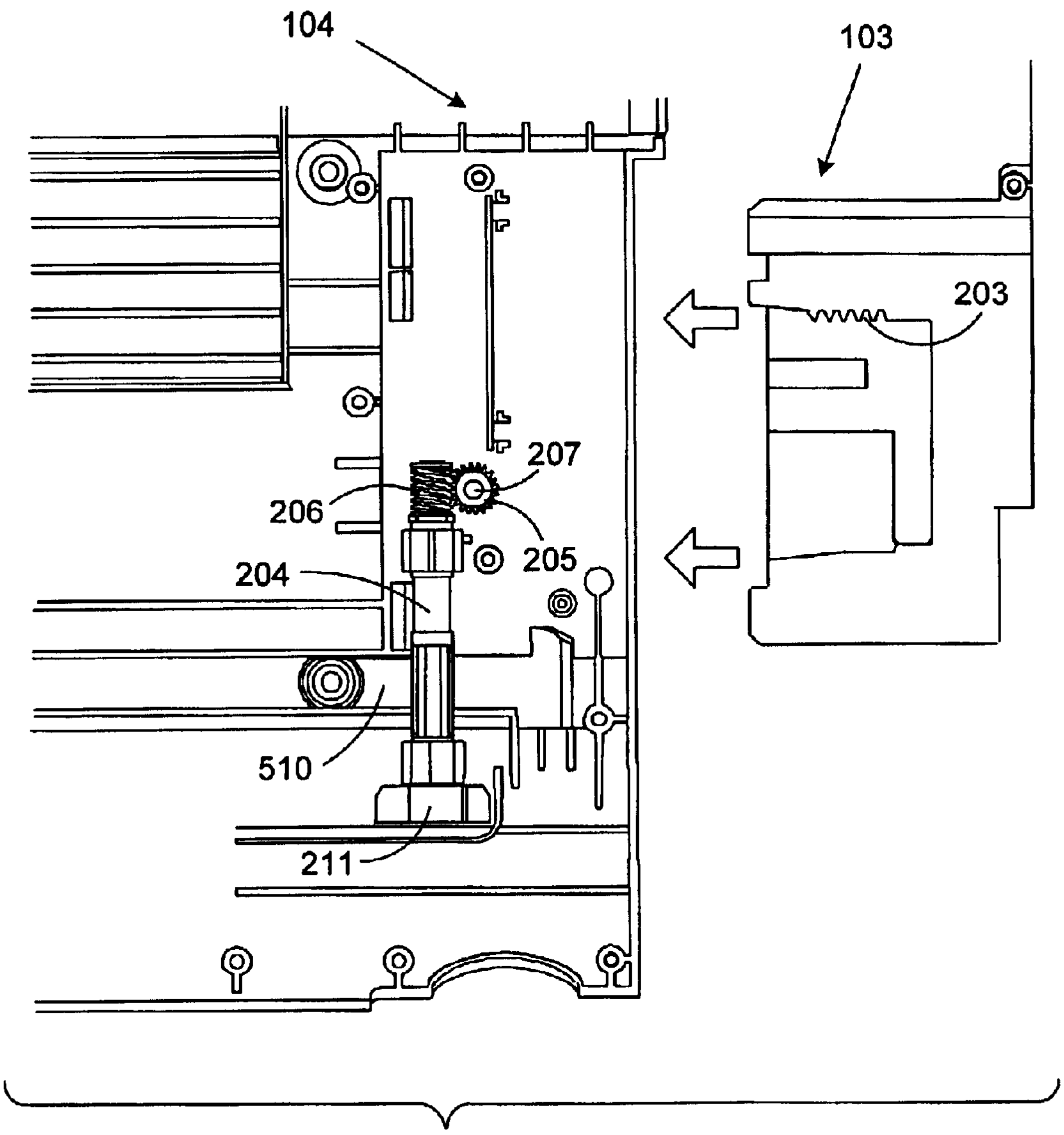
FIG. 6 illustrates a top down view of a cavity including gears and worm meshes in relation to a tongue portion, according to some embodiments of the present invention.

Referring now to FIG. 6, details of the present invention are illustrated with a topside view of the cavity 104, including a worm mesh comprising a worm gear 205 mounted concentrically on the end of the drive shaft 207 and a worm 206 operatively engaged with the worm gear 205. The worm 206 can be concentrically mounted on one end of a tubular extension 204 which can protrude through the side 510 of the second module 102 and attached to the handle 211. In addition, a topside view of the tongue 103 illustrates a rack 203 which will engage the first spur gear 201 as the tongue enters the cavity during assembly.

Figure 7:
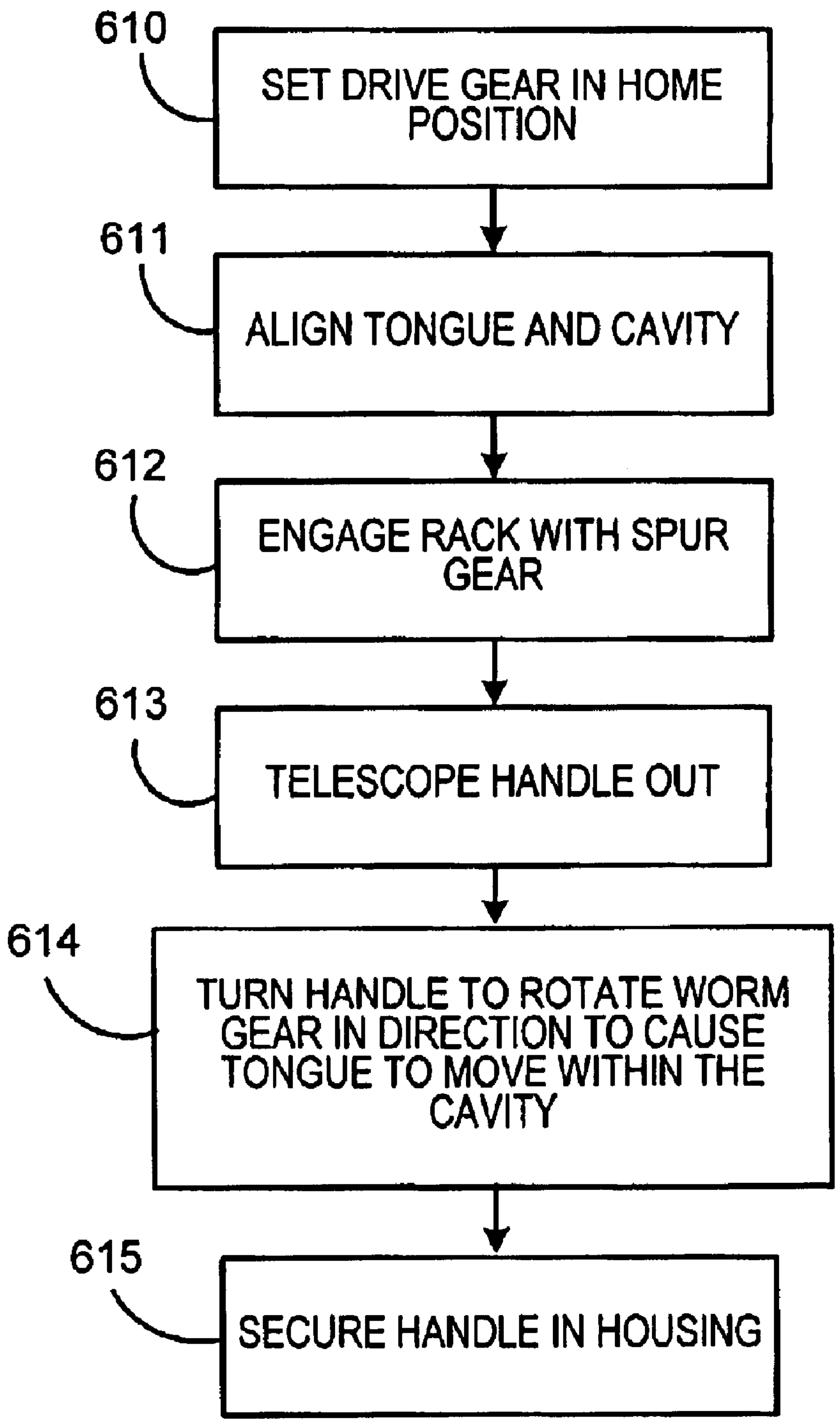
FIG. 7 illustrates flow of steps that can be completed while practicing the present invention.

Referring now to FIG. 7, steps are illustrated which can be executed during implementation of inventive steps included in the present invention. At 610, during assembly of disparate modules on a mailing machine, a drive gear 202 can be set in a home position that is favorable for engaging a rack 203 on a tongue 103 inserted into the cavity 104. Setting in a home position can include rotating through an arc of lost motion, such as, approximately 45 degrees, 90 degrees, or 180 degrees, or some other arc, as discussed above. At 611 the tongue 103 on the first module 101 and the cavity 104 on the second module 102 can be aligned, such as by manually entering the tongue 103 into the cavity 104. At 612 as the tongue 103 enters the cavity 104, the rack 203 can be engaged with the first spur gear 201.

At 613, the handle 211 can be telescoped out into an operating position and at 614 turned to rotate the worm gear 205 in a direction which will cause the tongue 103 to move within the cavity 104 such that the movement will cause the tongue 103 to further enter the cavity 104 or become separated from the cavity 104. Some embodiments can limit manual alignment so that the first module 101 and the second module 102 can be brought together or separated only by turning the worm mesh with the handle 211. In these embodiments, manual alignment ends upon rack 104 engagement with the first spur gear 201. At 615, when the tongue 103 is brought into the cavity 104 to a point desired, the handle can be secured into the housing 510. In addition, some embodiments can include lost motion in the gear train which facilitates alignment of the handle into a parked position secured in the housing.

In another aspect, some embodiments can include a break away feature incorporated into the handle which limits the amount of torque the handle can impart to the tubular extension and gear train and thereby prevent excessive forces to the gear train and other interface components.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. For example, an alignment pin or other mechanism can be utilized to further facilitate manual alignment. Components of the present invention can be formed from plastic, steel, aluminum, alloy or other material. In addition, although exemplary embodiments illustrated one rack 203 operatively engaged with the first spur gear 201, some embodiments can include more than one rack 203 operatively engaged by additional spur gears or the drive gear 202, the rack 203 can operatively engage a drive gear and the first spur gear can be omitted, or other design. Embodiments can include, for example, an additional rack 203 formed into the tongue 103 in a location that will operatively engage the drive gear 202 as the first module 101 and the second module 102 are assembled. Utilization of more than one rack engaged by more than one gear may be useful to maintain proper alignment of the modules 101 and 102 during assembly. Other variations relating to implementation of the functions described herein can also be implemented. Accordingly, other embodiments are within the scope of the following claims.

What is claimed is:

1. A machine comprising:

a first module;

a second module; and a connection device to connect the first module and the second module together, the connection device comprising:

a tongue extending from the first module and comprising a rack;

a cavity formed into the second module for receiving the tongue on the first module;

a spur gear mounted to the second module and engaging the rack of the tongue received into the cavity; and a mechanism for controlling movement of the spur gear, the mechanism comprising a drive gear meshed with the spur gear and concentrically mounted on one end of a drive shaft and a worm gear mounted concentrically on an opposing end of the drive shaft, wherein rotation of the worm gear causes the spur gear and the drive gear to rotate and cause movement in the rack received into the cavity and separate or bring together the modules as a result of the movement in the rack.

2. The machine of claim 1, wherein the connection device further comprises:

a worm engaging the worm gear mounted concentrically on the opposing end of the drive shaft, the worm being mounted on a tubular extension protruding through a wall of the second module.

3. The machine of claim 2, wherein the connection device further comprises:

a handle connected to the tubular extension.

4. The machine of claim 3 wherein the handle telescopes from a housing of the second module to an operating position.

5. The machine of claim 1, wherein the connection device further comprises:

means for providing lost motion between the drive gear and the drive shaft sufficient to allow the rack to engage at least one gear tooth on the spur gear before rotation of the spur gear is restricted by the drive shaft.

6. The machine of claim 5 wherein the means for providing lost motion comprises a cross pin secured to the drive shaft and engaging the drive gear at opposing surfaces formed into the drive gear to allow a predetermined angle of free rotation.

7. The machine of claim 6 wherein the opposing surfaces are positioned at an angle approximately equal to (X+0.5) *(360/Ng), wherein X is a whole integer and Ng is the number teeth on the gear.

8. The machine of claim 7 wherein X is 1 or 2.

9. The machine of claim 5 wherein the means for providing lost motion between the drive gear and the drive shaft comprises a spring for maintaining the drive gear in a position allowing maximum lost motion before the gear motion is restricted.

10. The machine of claim 5, wherein the connection device further comprises:

a second rack included in the tongue, wherein the second rack is positioned to operatively engage the drive gear when the tongue is received into the cavity.

11. The machine of claim 10, wherein the lost motion between the drive gear and the drive shaft additionally allows the second rack to engage at least one gear tooth on the drive gear before rotation of the drive gear is restricted by the drive shaft.

12. The machine of claim 5 wherein the means for providing lost motion provides approximately 180 degrees of lost motion.

13. The machine of claim 5 wherein the means for providing lost motion provides approximately 90 degrees of lost motion.

14. The machine of claim 1 wherein the machine is a mailing machine.

15. A method for assembling modules on a machine, the method comprising:

setting a drive gear in a home position, wherein the setting includes a predetermined amount of lost motion;

manually aligning a tongue comprising a rack on a first module with a cavity including the drive gear on a second module;

operatively engaging the rack with the drive gear via a spur gear included on the tongue; and turning a handle to rotate a worm mesh connected to the drive gear thereby causing the gear to rotate and move the rack.

16. The method of claim 15 additionally comprising the step of securing the handle.

17. The method of claim 15, wherein the predetermined amount of lost motion is approximately equal to 180 degrees.

18. The method of claim 15, wherein the predetermined amount of lost motion comprises a sufficient amount to allow the drive gear to be set in a position favorable to engaging the rack.

19. The method of claim 15, wherein the machine is a mailing machine.

* * * * *